July 16, 1957 F. T. MAHAN 2,799,044
SAUSAGE PATTY FORMING MACHINE
Filed Dec. 14, 1953 3 Sheets-Sheet 1

INVENTOR.
Frank T. Mahan, Deceased,
Helen Jean Mahan, Administratrix
BY
Thomas E. Scofield
ATTORNEY.

INVENTOR.
Frank T. Mahan, Deceased
Helen Jean Mahan, Administratrix
BY
Thomas E. Scofield
ATTORNEY.

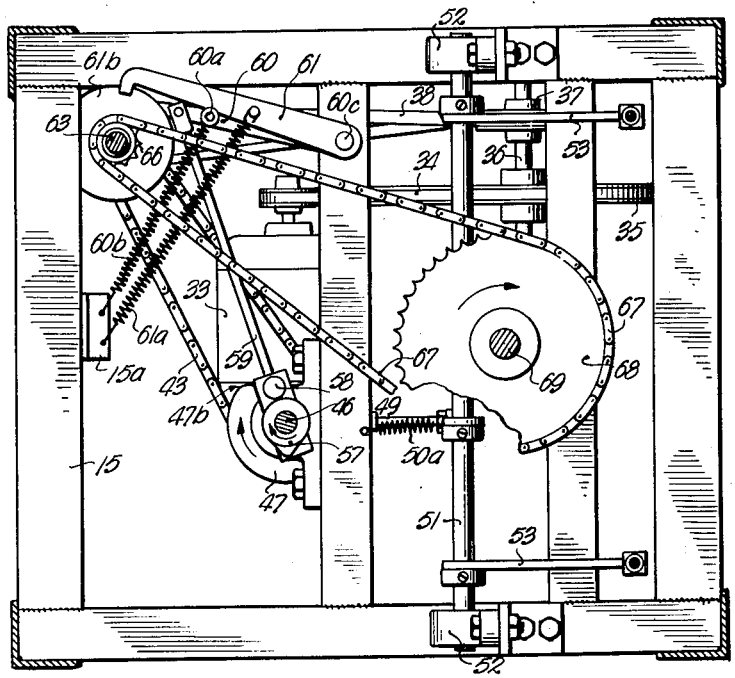

United States Patent Office 2,799,044
Patented July 16, 1957

2,799,044
SAUSAGE PATTY FORMING MACHINE

Frank T. Mahan, deceased, late of Wyandotte County, Kans., by Helen Jean Mahan, administratrix, Bonner Springs, Kans., assignor to R. B. Rice Sausage Co., Inc., a corporation of Missouri Application December 14, 1953, Serial No. 398,086

5 Claims. (Cl. 17—32)

This invention relates to pork sausage meat patty forming machines and refers more particularly to such a machine which takes pork sausage meat in quantity, forms sausage patties therefrom and taps them free of the forming mechanism in such quantity as to make practical mass production of pork sausage meat patties.

There is presently a large consumer demand for predressed and prepared meats which may be purchased in package form. This demand extends to meat patties of all kinds. Therefore it has become important to provide means for mass producing such meat patties to supply this market.

It has been possible heretofore to produce a few types of meat patties in commercial quantities. However, to this date, it has not proved feasible to manufacture pork sausage meat patties in mass production. Owing to the nature of the sausage meat and the conditions under which sausage meat is produced a number of almost insuperable obstacles arise which have defeated previous efforts.

A major problem that must be met is that of the lard in the meat. If the patty-forming machine heats in operation to a certain temperature the grease in the meat will melt and thereby clog the mechanism. Another difficulty is the fact that it is not feasible to freeze or nearly freeze the sausage meat, as such action will result in discoloration of the product. Unfrozen meat has a greater tendency to adhere and cling to metallic surfaces. Furthermore, to be economically feasible, very large numbers of patties must be produced—for example, a ton of meat per hour must be processed to produce over 20,000 one and one-half ounce patties per hour. This requires a very high speed mechanism. Additionally, such a machine must be able to operate continuously for extended periods at a room temperature near freezing and in a salt mist atmosphere.

Therefore, an object of the present invention is to provide a pork sausage patty making machine which does not require frozen or nearly frozen meat, whereby the quality and flavor of the product may be maintained.

A further object is to provide such a machine which will process over a ton of sausage meat per hour or produce over 21,000 one and one-half ounce patties per hour or any lesser desired amount.

A further object is to provide such a machine which will operate successfully at a room temperature of approximately 35° F. in a salt mist atmosphere with sausage meat at approximately 50° F.

A further object is to provide such a machine which will require a maximum of two operators.

A further object is to produce such a sausage patty making machine which does not produce sufficient heat when functioning at full capacity to cause melting of the fat from the meat, thus avoiding any clogging threat from such source.

A further object is to provide such a machine wherein the patties are formed by extrusion of sausage meat into cavities in a plate from which the patties are subsequently knocked out by cup-shaped disks in such manner that no excess meat adheres to the plate, plate cavities or knockout cups to clog the machine.

A further object is to provide such a machine with which a conventional sausage stuffing machine may be employed to feed the meat into the patty-forming mechanism.

A further object is to provide such a machine which produces sausage patties of uniform density, weight and size in a completely automatic operation, which patties are ready for immediate packaging.

Still another object is to provide a sausage patty forming machine wherein the sausage meat is untouched by human hands from the stuffing machine to the package.

Other and further objects of this invention will appear from the following description.

In the accompanying drawings which form a part of the instant specification there is shown one embodiment adapted for use in practicing the invention, and in the drawings like reference numerals are used to indicate like parts in the various views:

Fig. 4 is a view taken along the line 4—4 of Fig. 3 in the direction of the arrows, parts being broken away for purposes of illustration;

Fig. 5 is a view taken along the line 5—5 of Fig. 3 in the direction of the arrows;

Fig. 6 is a view taken along the line 6—6 of Fig. 3 in the direction of the arrows;

Fig. 7 is a view taken along the lines 7—7 of Fig. 2 in the direction of the arrows.

The invention comprises a sausage patty forming device which operates in the following manner. Pork sausage meat from a conventional sausage stuffing machine is forced into holes in an intermittently rotating disk to form sausage patties. In the path of its rotation the disk carries the meat-filled holes under a pair of knockout cups which tap out the patties onto an endless belt. It will be seen that this result is obtained by providing machinery whereby the disk rotation and the motion of the patty knockouts are powered and synchronized to provide a high speed precision device which produces a complete solution to the problem of volume sausage patty production while maintaining the desired level of quality in the product.

Figure 1:
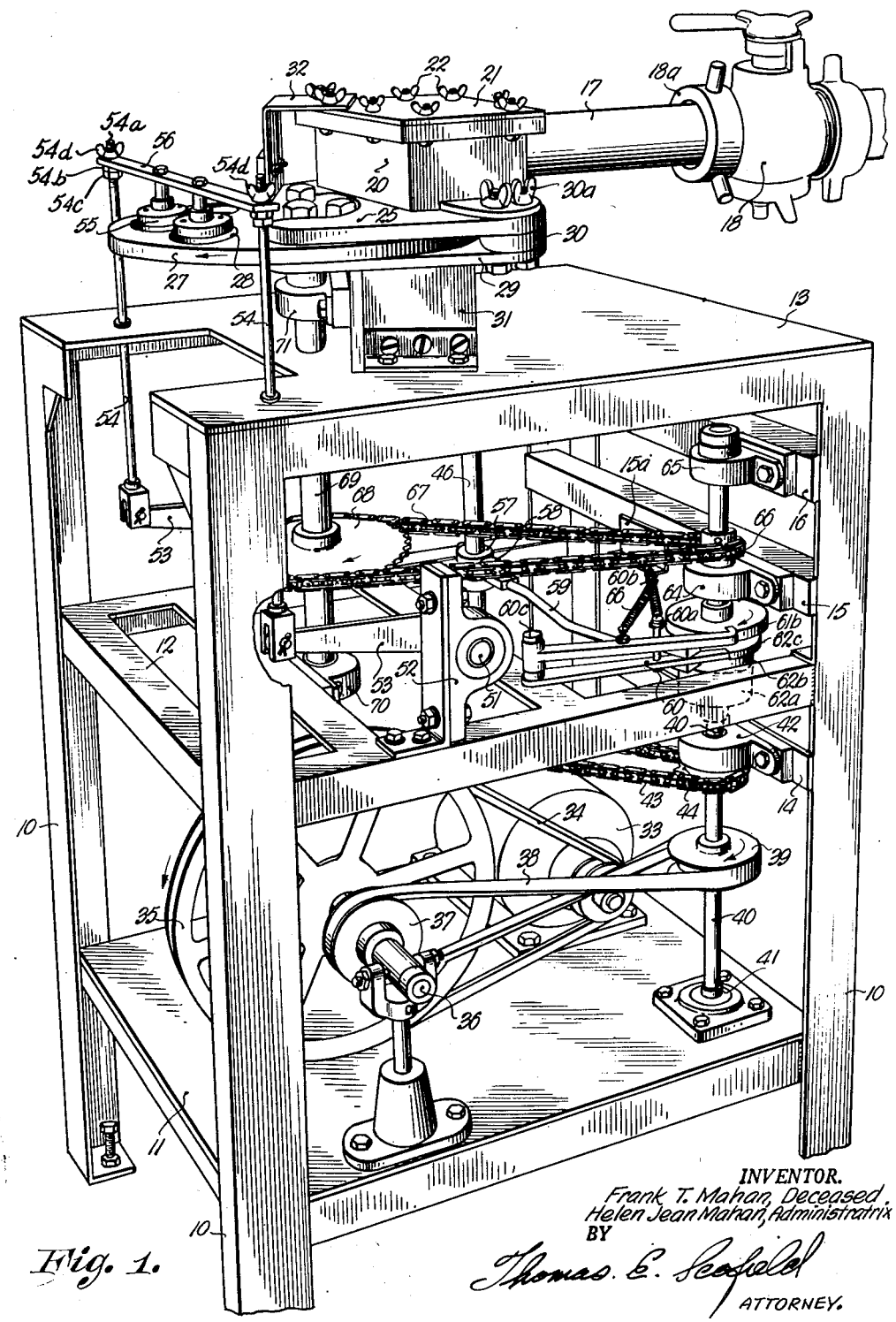
Fig. 1 is an overall perspective view of the apparatus embodying the invention with some parts omitted for clarity, parts being broken away for purposes of illustration.

In the drawings, the numeral 10 refers to the legs of a steel frame which has decks 11, 12, and 13 at three levels, as best shown in Fig. 1. Bearing supports 14, 15, and 16 are fastened between the two rear legs 10.

Figure 2:
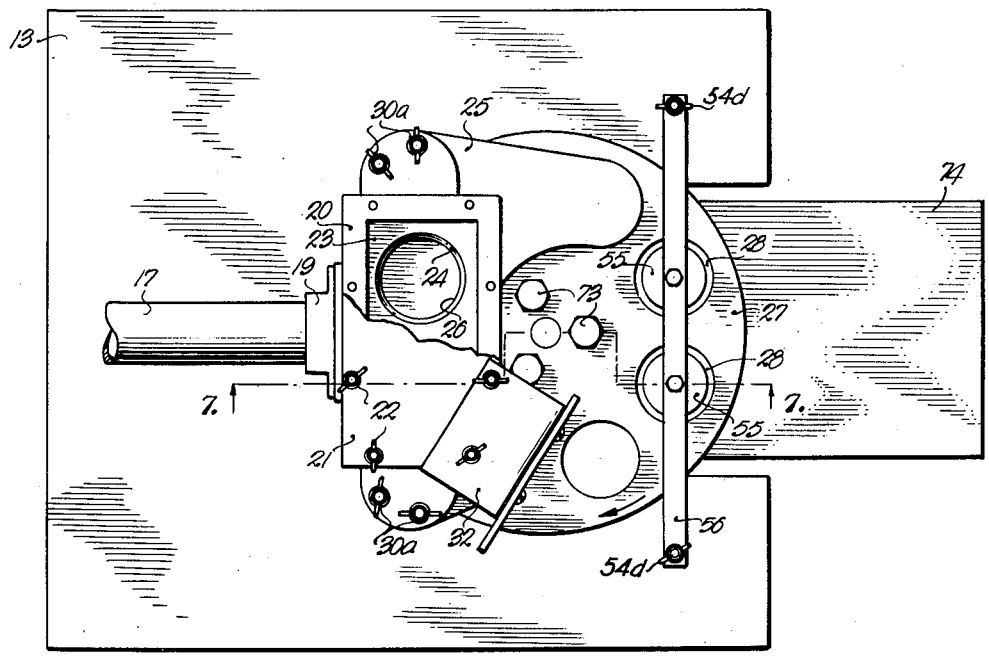
Fig. 2 is a top view of the apparatus shown in Fig. 1.

Positioned on top deck or level 13 is the sausage patty forming mechanism. Sausage meat is forced from a conventional pneumatic sausage stuffing machine (not shown) into feed tube 17 having valve 18 whereby the flow of meat may be controlled. Clamp 19 fastens tube 17 to turret feed box 20 having cover 21 secured by wing nut fasteners 22. The floor 23 of the turret feed box 20 has two holes 24 therein, the top edges of which are chamfered 45° as is best shown in Figs. 2 and 7. The turret feed box rests on the feed box base plate 25 which has two holes 26 drilled therein of a diameter to match the holes in the floor 23. The feed box base plate 25 is positioned over the circular turret plate 27 which has a number of holes 28 pierced therein of a diameter and separation equal to those in the feed box base plate and turret feed box floor. Turret plate 27 rests on turret box base plate 29 which is similar in shape to the feed box base plate. Spacers 30 ensures that the fit between plates 25 and 29 and the turret plate 27 is extremely close but does not restrict rotation of the turret plate. This relationship may be adjusted by shims to the proper clearance. Turret box base plate 29 is fixed to turret base 31 which in turn is secured to top level 13. Fastened to cover 21 is scraper 32 best shown in Figs. 2 and 3.

Mounted on lower level 11 is motor 33 which drives through V-belt 34 speed reducing pulley 35 on horizontal shaft 36. Pulley 37 through a ninety degree crossed V-belt 38 drives pulley 39 on vertical shaft 40. Shaft 40 is positioned in bearings 41 and 42 and ends in one side of double capacity clutch 62 to be later described.

Arrows have been inserted on the drawings to indicate the directions of rotation of the various revolving parts.

Chain 43 on sprocket wheels 44 and 45 drives shaft 46 with a speed reduction of one-half. Two cams are mounted on shaft 46, best seen in Fig. 3. Knockout cam 47 in its rotation acts on cam follower 48 (see Fig. 5) thereby moving arm 49 toward the front of the frame. This motion pivots lever arm 50 forward. Lever arm 50 is attached to horizontal shaft 51 mounted in bearings 52 (best shown in Figs. 3, 4) which is rotated, pivoting lever arms 53 and the attached rods 54 upwards. This raises the knockout cups 55 on bar 56 above the turret plate 27. When cam follower 48 reaches dropoff 47a of cam 47 spring 50a acts to snap down the knockout cups through a reversal of the lever action just described.

Knockout cups 55 are circular discs having a circumferential flange 55a formed on the underside. Ports 55b serve to prevent formation of a vacuum at the upper surface of the head. The diameter of cups 55 is considerably less than the inside diameters of turret plate perforations 28.

Figure 3:
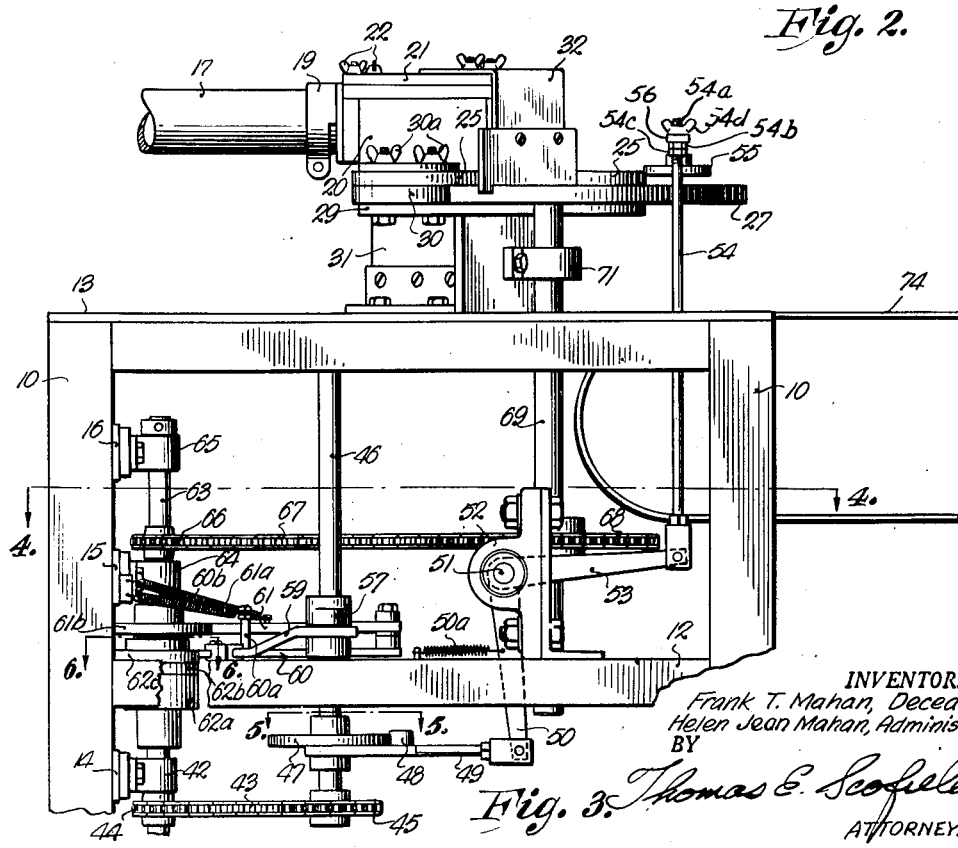
Fig. 3 is a side view of the upper portion of the apparatus of Fig. 1, parts being broken away for purposes of illustration.

Clutch trip cam 57, best seen in Figs. 3 and 4, in its rotation acts on clutch trip follower 58 on rod 59. Rod 59 is attached at its end to clutch trip lever 60. Pin 60a on clutch trip lever 60 abuts positive stop trip lever 61 so that any action of rod 59 on clutch trip lever 60 also affects positive stop trip lever 61. Clutch trip lever 60 and positive stop trip lever 61 are mounted on level 12 by bolt 60c. Tension springs 60b and 61a attached to bracket 15a on bearing support 15 act on levers 60 and 61 respectively.

Clutch 62 is a Hilliard Type 6 single revolution clutch, assembled for clockwise rotation; its internal construction is fully disclosed in Dickens Patent 2,140,737, to which reference can be made for an understanding thereof. For present purposes, suffice it to say that the clutch has a lower, or driving, side 62a and an upper, or driven side 62b. Lower side 62a receives the end of shaft 40 which is fixed thereto. Upper side 62b receives the end of shaft 63 which is fixed thereto. Shaft 63 is mounted in bearings 64 and 65. Trip cam step 62c is a part of upper side 62b. When trip cam step 62c is engaged by clutch trip lever 60 the internal mechanism of the clutch 62 disengages upper side 62b from lower side 62a. When trip cam step 62c is released by clutch trip lever 60, the internal mechanism of clutch 62 operates to engage upper side 62b with lower side 62a thereby producing rotation of shaft 63. Positive stop cam 61b is fastened to shaft 63 and engaged and disengaged by positive stop trip lever 61 to provide extremely accurate indexing of clutch 62 in stop position.

Sprocket 66 on shaft 63 drives through chain 67 a sprocket 68 with a speed reduction of one-fourth. Sprocket 68 is mounted on turret shaft 69 which is supported in turret shaft bearings 70 and 71 and is attached to turret plate hub 72 by key 72a. Hub 72 in turn is fixed to turret plate 27 by bolts 73.

Through the agency of clutch 62 and the speed reductions from shaft 40 to shaft 46 and shaft 63 to shaft 69, the timing problem of moving the meat charged perforations under the knockout cups, stopping the turret plate, lowering and raising the cups to tap out the patties and moving the plate to a new position—all in proper sequence—is solved. It should be noted that the specific arithmetical speed reductions and gearings set forth herein are not exclusive and are not intended to be limiting. The specific relationships between the parts selected depends on the number of knockout cups employed, the number of holes in the turret plate, the cam relations on the cam shaft, the speed reductions between the various shafts, etc.

The sequence of operation may be described as follows:

Shaft 40 rotates constantly at a fixed rate of speed and drives clutch trip cam 57 and knockout cam 47 so that they operate once per every two revolutions of the shaft 40.

The cycle of operation of the clutch trip cam 57 and the dependent revolution of the turret plate will be described as they relate to the motion of the knockout cam 47.

When knockout cam follower 48 reaches point 47b on the surface of knockout cam 47, the knockout cups are at their highest position. Any time after the cups rise above the surface of the plate, clutch trip cam 57 can begin to actuate clutch trip follower 58 and thereby clutch trip lever 60 and positive stop lever 61 to permit shaft 63 to rotate thereby rotating turret plate 37. One revolution of shaft 63 serves to move plate 22 two positions (one fourth of a revolution). Plate 27, in the illustrated embodiment of the invention, has eight equally spaced circumferential holes. Thus four successive activations of turret shaft 69 are required to complete a single revolution of the plate. At the end of the revolution of shaft 63, clutch trip lever 60 and positive stop lever 61 re-engage thereby stopping the turret plate in position under cups 55. Since shaft 46 rotates once for every two revolutions of shaft 40, knockout cam follower 48, after turret plate 27 ceases to move, reaches dropoff 47a of cam 47 thereby actuating cups 55 under impetus of spring 50a. As cam follower 48 moves toward 47b on cam 47 the cups rise again and the cycle is ready to begin anew.

As turret plate 27 rotates, scraper 32 removes any excess of meat from the upper surface thereof.

It is desirable to produce the meat patties in a standard size. The presently preferred size is two and one-half inches in diameter by one-half inch thick. Such a patty has an average weight of approximately one and one-half ounces. Thus the perforations 28 in the turret plate are formed preferably with such an inside diameter and the plate itself is preferably one-half inch thick.

The size of the knockout cups is critical to the proper operation of the machine. If the cup diameter approaches too closely the inside diameter of the perforations 28, the meat will stick to the plunger, and, additionally, very high speed operation becomes hazardous with the increase in the possibility of the cups contacting the plate 27. If the diameter of the cup is too small relative to the inside diameter of the perforations the patty will be deformed by the blow of the cup. It has been discovered that providing a knockout cup having a diameter four-fifths that of the inside diameter of the perforations will permit achievement of the twin goals of high speed operation and clean knockout. Thus, with a two and one-half inch perforation diameter, a two inch cup diameter is optimum.

The provision of the knockout cup rim 55a and ports 55b are also critical in preventing sticking of the meat to the cup. In the two inch diameter cup the rim is constructed one-eighth of an inch thick at the face of the cup and one thirty-second of an inch thick at its edge.

Knockout cups 55 have a limited range of motion which is defined by the surface of cam 47 and the lever arms connected thereto. The sharp dropoff 47a on cam 47 gives free action to spring 50a to act on the knockout cup assembly with full acceleration. By adjusting this motion with relation to turret plate 27, it is possible to control the magnitude of the force with which the cups 55 strike the patty in holes 28. This adjustment is made possible by threads 54a on rods 54. Nuts 54b and c and wing nut 54d permit positioning bar 56 at any desired level relative to the plate 27 thereby adjusting the path of travel of the cups 55. When variations in the temperature, density etc. of the meat occur this adjustment is significant. Bar 56 is thus also removable for cleaning of the cups or other purposes.

It should also be noted that the patty-forming mechanism may be readily disassembled for cleaning or repair. To disassemble, coupling 18a releases tube 17 from valve 18. Top 21 is unscrewed from box 20. Wing nuts 30a are then unscrewed and box 20, plate 25 and spacers 30 may be removed. The removal of bolts 73 will then permit removal of turret plate 27. Plate 25 is fastened to turret base 31 by a plurality of screws (not shown). The removal of the previously mentioned parts, of course, together with knockout cups 55 gives access to all parts contacted by the meat in the patty-forming operation. Thus it may be seen that all elements are readily accessible for cleaning or repair.

After the meat patties have been tapped from holes 28 they fall downwardly to be caught on an endless belt conveyor 74 of standard type (Fig. 2). From this conveyor the patties are then transferred to the package.

Chain tighteners are customarily employed to tighten chains 43 and 67 but have been omitted in the various views for clarity.

As the patty-making machine is required to work oftentimes in a salt mist atmosphere, all working parts are nickel-plated to minimize corrosion.

It is obvious that the machine may be operated at varying speeds by varying the speed of motor 33. Such a machine has proven its ability to process a ton of meat per hour, which is equivalent to 21,340 one and a half ounce patties per hour.

It should be repeated that one of the primary features of this machine is its ability to process meat which is not nearly frozen. The quality and flavor of pork sausage meat products is maintained only by using fresh unfrozen pork the same day of its slaughter. Thus this device provides for the first time means for the quantity production of pork sausage meat patties with no loss in quality.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A machine for making meat patties including in combination a frame, a power source connected to a continuously driven main drive shaft, said main drive shaft attached to one side of a clutch, a secondary drive shaft attached to the opposite side of said clutch, a cam shaft continuously driven from the main drive shaft, a turret shaft driven by said secondary drive shaft, a rotatable turret plate having patty size holes therein attached to said turret shaft and rotated thereby, a patty knockout cup movable in and out of said holes positioned adjacent said plate, means operating from said cam shaft for intermittently engaging and disengaging the sides of the clutch, means operating from said cam shaft for intermittently operating said knockout cup and means for synchronizing said clutch engaging means and said knockout cup operating means whereby the cup operates only when the clutch is disengaged.

2. A machine as in claim 1 wherein said synchronizing means comprises two cams mounted on said cam shaft, one of said cams connected to one side of said clutch and the other connected to the knockout cup.

3. A machine for making meat patties including in combination a frame, a power source connected to a continuously driven main drive shaft, said main drive shaft attached to one side of a clutch, a secondary drive shaft attached to the opposite side of said clutch, a cam shaft continuously driven from the main drive shaft, a turret shaft driven by said secondary drive shaft, a rotative turret plate having patty size holes therein attached to said turret shaft and rotated thereby, meat feeding mechanism to fill the holes in said plate positioned adjacent the surface of said plate, a patty knockout cup movable in and out of said holes positioned adjacent said plate, means operating from said cam shaft for intermittently engaging and disengaging the sides of the clutch, means operating from said cam shaft for intermittently operating said knockout cup and means for synchronizing said clutch engaging means and said knockout cup operating means whereby the cup operates only when the clutch is disengaged.

4. A machine for making meat patties comprising a rotatable mold plate having a plurality of circumferentially spaced patty size holes therein, a continuously operating power drive source, clutch and transmission mechanism connecting said source with said plate to cause said plate to advance in step-by-step rotation with pauses between each period of movement, at least one knockout member disposed adjacent said plate and movable in a path normal to the plate, said member being so located that its path of travel is aligned with one of said holes during each of said pauses, means for supporting said knockout member including linkage operable to move said member into and out of successive ones of said holes during said pauses, yieldable means associated with said linkage and continually urging said knockout member toward said plate, and mechanism engaging said linkage during the periods of movement of said plate to maintain said knockout member out of contact with said plate throughout said periods of movement, said mechanism including means for releasing said linkage to act under the influence of said yieldable means during each of said pauses thereby to produce a rapid impact stroke of said knockout member into said holes.

5. A machine as in claim 4 wherein said last mentioned mechanism comprises a rotary cam shaft driven in one direction from said power source, a rotary cam affixed to said shaft and rotated therewith having an abrupt drop-off at one point in its periphery, and a cam follower secured to said linkage and continually urged by said spring against the periphery of said cam.

References Cited in the file of this patent

UNITED STATES PATENTS

| 1,648,834 | Wallace | Nov. 8, 1927 |
| 2,176,905 | King | Oct. 24, 1939 |
| 2,185,174 | Hendler | Jan. 2, 1940 |
| 2,475,463 | Santo | July 5, 1949 |
| 2,530,061 | Holly | Nov. 14, 1950 |